March 12, 1968 R. J. FORD 3,372,435
APPARATUS FOR FORMING PLASTIC MEMBERS
Filed Feb. 18, 1966 2 Sheets-Sheet 1

INVENTOR:
Robert J. Ford,
BY Franklin J. Visek
Robert J. McDonnell
ATTORNEYS

March 12, 1968  R. J. FORD  3,372,435
APPARATUS FOR FORMING PLASTIC MEMBERS
Filed Feb. 18, 1966  2 Sheets-Sheet 2
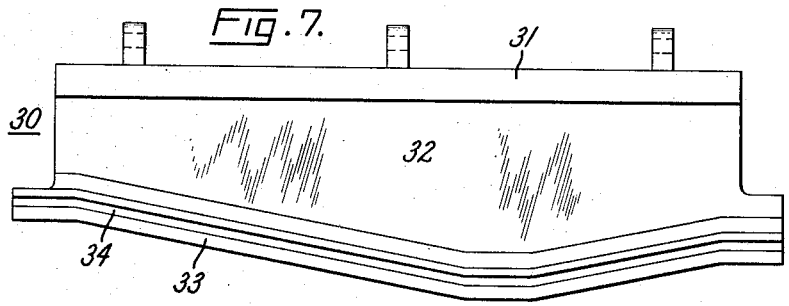
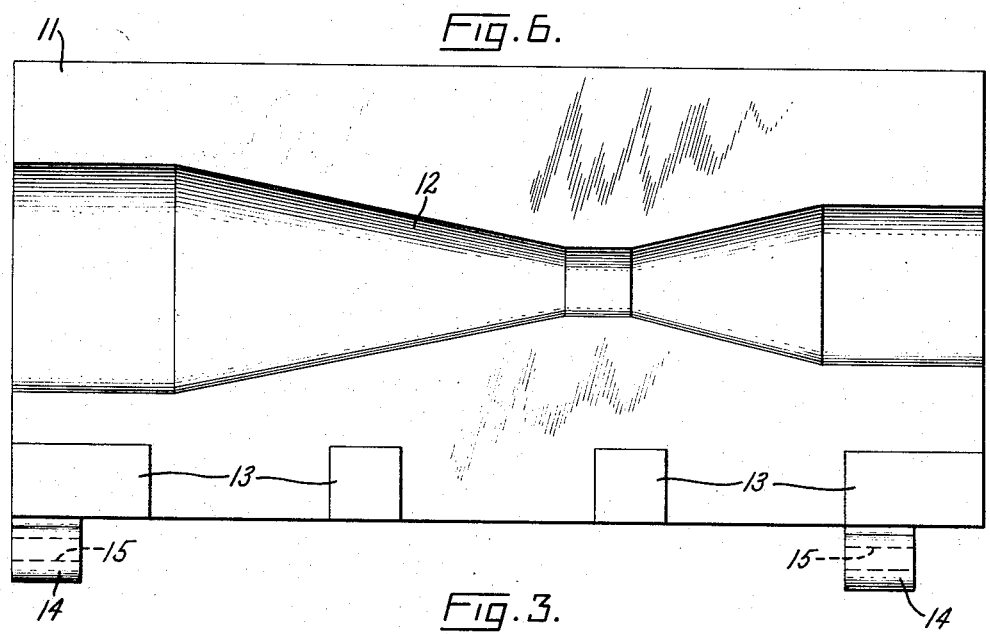
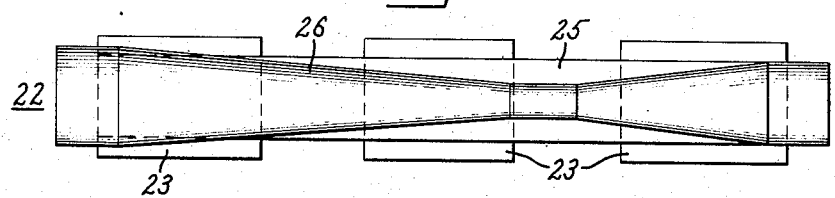
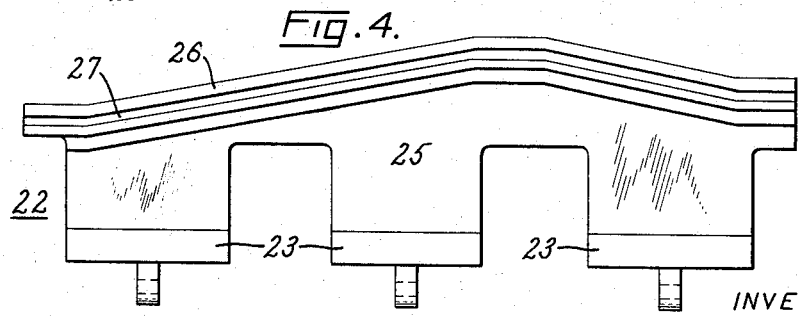
INVENTOR:
Robert J. Ford,
BY
ATTORNEYS

# United States Patent Office 3,372,435
Patented Mar. 12, 1968

3,372,435
APPARATUS FOR FORMING PLASTIC MEMBERS
Robert J. Ford, Broomall, Pa., assignor to The Boeing Company, Seattle, Wash., a corporation of Delaware
Filed Feb. 18, 1966, Ser. No. 528,445
14 Claims. (Cl. 18—35)

This invention relates to an apparatus for forming resin impregnated members, and more particularly, to an apparatus for forming resin impregnated fiber glass members without structural weaknesses and deformations. In forming resin impregnated fiber glass members with existing hinged split die molds, flashing of the member is a major problem because in order to obtain the desired continuity of surface configuration of the formed member, the flash must be trimmed. However, since the flash is comprised of both binding resin and continuous fiber glass material, trimming the flash severs the material. This greatly decreases the overall integral strength of the member.

Presently, in forming a member with a split die mold, the member is placed in position and the mold halves are brought together about the member forcing the member to assume the configuration of the die cavity. Because of the pressure exerted upon the member by the closing mold halves, portions of the resin impregnated fiber glass member squeeze out of the die cavity into the hinge regions causing flash. This flash prevents the mold from fully closing, causes the molded member to assume an undesirable configuration, and as described hereinbefore, the trimming of the flash reduces the member's strength.

In the past, many attempts have been made to prevent the member from squeezing out in the hinge region. One such attempt has been the utilization of a shim positioned within the die cavity across the hinge opening. However, while the use of a shim solved the flash problem, it created new problems. When the mold halves mate, the shim tends to shift, because of the forming pressure, from its position across the hinge opening to an indeterminate position. In addition, because of the forming pressure of the mold halves, the resin impregnated material forms a lip about the edge of the shim, causing the shim to be essentially bonded to the member. This problem is twofold. That is, the lip must be trimmed severing the continuous material and the shim is frequently damaged beyond repair. Such damage to the shim is a particular problem since the fabrication of a shim is complex and costly. In order to withstand the substantial pressures developed, the shim is often fabricated from stainless steel, which is expensive and difficult to shape into the desired and often geometrically complex configuration. The fabrication of a shim is further complicated, because the shim must be of minimum thickness to prevent local deformation of the member. Such local deformation is extremely undesirable because it causes a resultant decrease in the member's overall strength, and greatly increases the probability of premature failure. While undercutting the mold cavity in the hinge region to receive a thicker shim might prevent the problem of the shim shifting and the local deformation, it is impractical because the undercutting tends to allow the resin impregnated material of the member to squeeze out into the undercut area around the shim. This causes an undesirable multiple flash and defeats the purpose of the shim.

The present invention solves the aforesaid problems by providing externally controlled movable inserts between the split die mold halves; the inserts are contoured to provide mold continuity and prevent squeeze-out of the continuous fiber glass material in the hinge region during the forming operation.

An object of this invention is to provide an apparatus for forming resin impregnated members.

Another object of this invention is to provide an apparatus for forming resin impregnated members without structural weaknesses.

Another object of this invention is to provide a device for obtaining continuity of mold cavity surface in a hinged split die mold.

Another object of this invention is to provide a device for aligning split die molds easily and automatically.

Another object of this invention is to provide a split die mold having a contoured insert for forming a member without surface irregularities.

Another object of this invention is to provide a split die mold having a contoured insert which is movable in response to external forces, so as to enable timely formation of a continuous mold cavity.

Another object of this invention is to provide a mold for pressure forming and curing laminated resin impregnated fiber glass members without reducing their strength.

Another object of this invention is to provide a device for economically forming members having a high aspect ratio.

Another object of this invention is to provide a mold capable of closing to form a continuous mold cavity while preventing the member being formed from squeezing out through the hinge.

Another object of this invention is to provide a mold capable of allowing excess resin to squeeze out while preventing squeeze-out of the continuous material during forming of the laminated member.

Various other objects and advantages will be readily perceived from the following description, drawings, and claims.

The attached drawings illustrate the preferred embodiments of the invention, in which:

FIGURE 3 is a top view of a spaced contoured insert adopted to be utilized in the apparatus illustrated in FIGURES 1 and 2;

FIGURE 4 is a side view of the spaced contoured insert of FIGURE 3;

FIGURE 6 is a side view of one half of the split die mold; and

FIGURE 7 is a side view of a continuous contoured insert adapted to be utilized in the apparatus illustrated in FIGURE 1.

Figure 1:
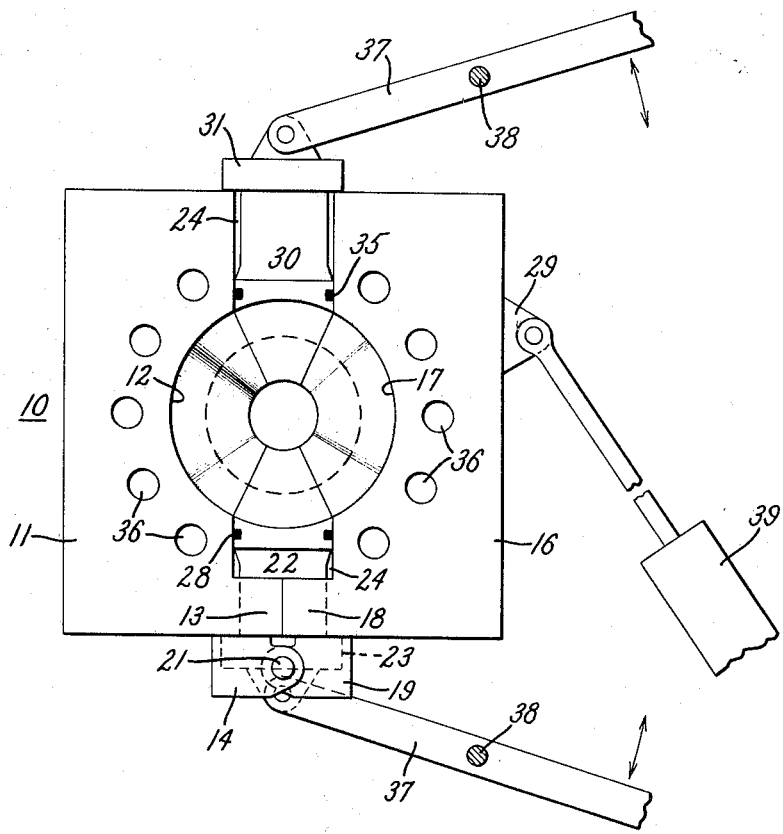
FIGURE 1 is an end view of an embodiment of the apparatus for forming members.

Referring now to the drawings, wherein like reference numbers designate like or corresponding parts throughout the several views, there is shown in FIGURE 1 a split die mold 10 having a pair of complementary mold halves 11 and 16, hinged together on one edge by a hinge pin 21. While the mold half 11 can be pivoted about the hinge pin 21, it is preferably held in a fixed position.

The mold half 11 has a contoured cavity 12 in one face thereof, and horizontal, laterally projecting stops 13 spaced along the lower edge of the cavitated face, as shown in FIGURE 6. The outer stops 13 have downwardly projecting lugs 14, as illustrated in FIGURES 1 and 6. The lugs 14 are preferably L shaped and have a coaxial bore 15 extending therethrough.

The mold half 16 which is pivotable about hinge pin 21 has a contoured cavity 17 in one face thereof. The contoured cavity 17 is complementary to the contoured cavity 12 of the mold half 11. Additionally, the mold half 16 has horizontal, laterally projecting stops 18 in complementary abutting relationship to the stops 13 of the mold half 11. The outer stops 18 have downwardly projecting lugs 19 extending therefrom. The lugs 19 are preferably L shaped and have a coaxial bore extending therethrough. In assembled position, the lugs 19 of the mold half 16 are adjacent the lugs 14 of the mold half 11, and the bores of the lugs 19 are in alignment with the bores 15 of the lugs 14. In this manner, the hinge pin 21 may be inserted in the aligned bores of the lugs 14 and 19 to provide the hinge about which the mold half 16 pivots. As may be readily understood from the foregoing, when the mold halves 11 and 16 are in their closed position, the stops 13 and 18 abut to provide a space 24 between the mold halves and to orientate the mold halves about the center line of the hinge 21, and perpendicular thereto.

Figure 5:
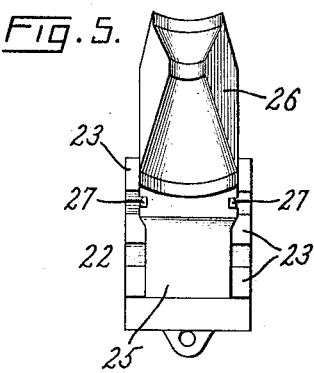
FIGURE 5 is a perspective view of the spaced contoured insert of FIGURE 3.

Referring now to FIGURES 3, 4, and 5, there is shown a contoured insert 22 having base portions 23 spaced along the length of the insert 22; the base portions 23 being of a width greater than the space 24 between the mold halves 11 and 16. A body portion 25 extends from the base portions 23 and is cut out between the base portions 23. The body portion 25 is of a width capable of sliding within space 24 between the mold halves 11 and 16. Secured to the top of the body portion 25, is an elongated contoured portion 26. The contour of the portion 26 is complementary to the contour of the cavities 12 and 17 to allow the formation of a continuous complementary mold in a manner hereinafter described.

The contoured portion 26 has a longitudinal groove 27 on each side thereof, and mounted within the grooves 27 are Teflon wipers 28. The wipers 28 serve the dual purpose of reducing the sliding friction between the insert 22 and the cavitated face of the mold halves 11 and 16, and limiting the amount of binding resin that can squeeze past the contoured portion 26 of the insert 22.

In assembly, before the mold halves 11 and 16 are hinged together by the hinge pin 21, the insert 22 is positioned between the mold halves. The insert 22 is placed so that the stops 13 and 18 extend through the cut out sections of the body portion 25, thereby holding the insert 22 in position between the mold halves with the base portion 23 extending outwardly of the outer edges of the mold halves 11 and 16. When the mold halves 11 and 16 are in their closed position, the inward movement of insert 22 towards the mold cavity is limited by the base portion 23 abutting the lower edge of the mold halves 11 and 16. In its innermost position, the contoured portion 26 of the insert 22 is in aligned relationship to the lower edges of the cavities 12 and 17, thereby forming a continuous complementary mold cavity along the lower portions of the cavities. The force of the base portion 23 pushing against the lower edges of the mold halves 11 and 16 serves an additional purpose in keeping the mold halves in alignment. It is an important object of this invention to maintain the mold halves in alignment by an external means, because of the inherent slop in hinges due to wear and the link which allows the hinged members to misalign.

In FIGURE 7, there is shown a continuous upper insert 30. The insert 30 is comprised of a base portion 31, body portion 32, and a contoured portion 33. The insert 30 is substantially the same as the insert 22 with the exception that the base portion 31 and the body portion 32 are not spaced or cut out, but extend substantially along the entire length of the contoured portion 33. The base portion 31 and the body portion 32 are the same width as their respective portions on the insert 22, and they serve the same purpose. The contoured portion 33 has a longitudinal groove 34 on each side thereof, and a Teflon wiper 35 mounted within the groove 34. The Teflon wiper 35 serves the same purpose as the Teflon wiper 28 of the insert 22.

In assembly, the insert 30 is placed in the space 24 between the mold halves 11 and 16 opposite the hinged end of the mold halves. When the insert 30 is mounted in the space 24, its innermost position towards the mold cavities is limited by the base portion 31 abutting the outer edges of the mold halves 11 and 16. At its innermost position, the insert 30 is in alignment with the upper edges of the cavities 12 and 17 to form a complementary mold cavity along the upper edge of the cavities 12 and 17.

An actuating means for reciprocating the inserts 22 and 30 inwardly towards and outwardly away from the cavities 12 and 17 is mounted in cooperating engagement with the inserts 22 and 30. As shown in FIGURE 1, the actuating means comprises a pair of lever arms 37 pivoted intermediate their ends at point 38; one end of the lever arms 37 is hingably secured to the outer surface of the base portions 23 and 31 of the inserts 22 and 30, respectively. The opposite ends of the lever arms 37 are respectively secured to individual actuators. When the actuators are engaged, the lever arms 37 pivot about pivot point 38 causing the inserts 22 and 30 to move towards or away from the cavities 12 and 17.

The mold halves 11 and 16 have a plurality of longitudinal bores 36 surrounding the cavities 12 and 17. Steam or other heating means is circulated through the bores 36 in order to heat the mold cavities 12 and 17 to a temperature sufficient to cause the member being formed to become semifluid. The exact number of heat bores 36 that are necessary depends upon the size and type of material to be formed and the properties of the heating means.

In order to open and close the mold 10 by pivoting the mold half 16 about hinge pin 21, laterally projecting ears 29 are secured to the outer surface of the mold half 16. An actuating means 39 is mounted in cooperating attachment with the ears 29, for pivoting the mold half 16 about the hinge pin 21.

In operation, the insert 22 is placed in the space 24 between the mold halves 11 and 16. The hinge pin 21 is inserted thorugh the aligned bores of the lugs 14 and 19 providing a hinge for pivoting movement thereabout. The mold 16 is pivoted in a direction away from mold half 11 by the actuating means 39. An oversized tubular member, comprised of unidirectional fiber glass filaments impregnated with a binding resin such as epoxy, is placed in the mold cavity and the mold half 16 is pivoted towards the mold half 11. Steam or other heating means is circulated through the bores 35 until the temperature of the mold 10 becomes sufficient to cause the binding resin to become semifluid. In the case of epoxy resin, a temperature in the range of 180 degrees Fahrenheit has been found to be suitable. When the binding resin becomes semifluid, the mating pressure of the mold halves 11 and 16 cause the oversized member to assume the contour of the mold cavities 12 and 17. At this point, the insert actuating means is engaged to pivot the lever arms 37 about pivot point 38, and thereby drive the inserts 22 and 30 towards the center of the mold cavities 12 and 17. When the inserts 22 and 30 reach their innermost position, the base portions 23 and 31 abut the outer edges of the mold halves 11 and 16, thereby aligning the mold halves and preventing further inward movement of the inserts 22 and 30. At their innermost position, the inserts 22 and 30 complete the formation of a continuous mold cavity, and thereby cause the forming of the member without deformation. The contoured portions 26 and 33 of the inserts 22 and 30, respectively, align with the edges of the cavities 12 and 17 preventing the fiber glass material of the member being formed from squeezing out of the mold cavity while allowing only a controlled amount of binding resin to squeeze out.

Figure 2:
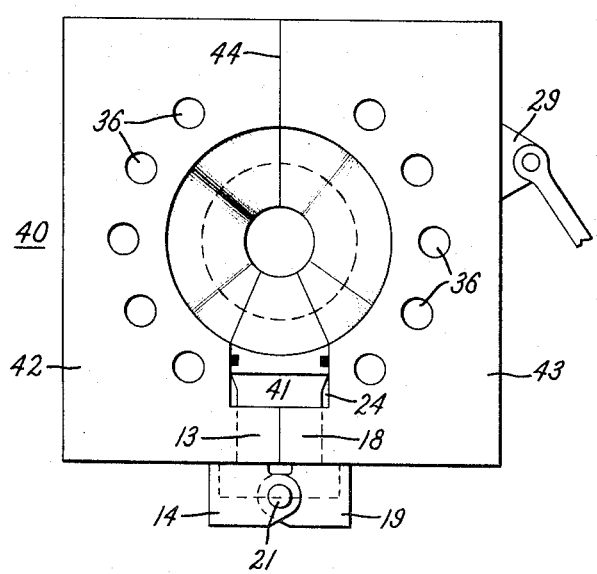
FIGURE 2 is an end view of another embodiment of the apparatus for forming members.

FIGURE 2 shows another embodiment of the invention, wherein a mold 40, insert 41, and all the actuating means are the same or similar to the prior embodiment with the exception that cavitated mold halves 42 and 43 have parallel mating upper surfaces 44 extending the length of the mold halves 42 and 43. The parallel surfaces 44 abut in sealing relationship along the upper half of the mold halves 42 and 43 when the mold halves are in their mating position.

An insert 41 identical to the insert 22 is positioned between the lower surfaces of the cavitated mold halves 42 and 43. The insert 41 serves the same purposes as the inserts 22 and 30 in the mold 10; namely, the formation of the continuous complementary mold and the prevention of the member's structural material from squeezing out into the hinge region. While the fiber glass filaments are prevented from squeezing out, a very small amount of binding resin may squeeze out to form a resin flash. This resin flash can be trimmed off without destroying or severing any fiber glass filaments, and consequently, weakening the overall structural characteristics of the member being formed.

I claim:
1. An apparatus for molding comprising:
   a pair of mold halves having complementary cavities therein,
   a hinge pivotally connecting said mold halves on one edge thereof in spaced aligned relationship,
   a contoured insert slidably mounted in the space between said mold halves so as to be capable of movement toward and away from said complementary cavities, and
   means for reciprocating said insert towards and away from said cavities, whereby when at the innermost position said insert and mold halves form a continuous complementary mold.
2. An apparatus for molding comprising:
   a pair of mold halves having complementary cavities therein,
   a hinge pivotably connecting said mold halves on one edge thereof in spaced aligned relationship,
   a first contoured insert mounted in the spaced area between the hinged edge and complementary cavities of said mold halves and radially slidable therein,
   a second contoured insert mounted in the spaced area between the edge opposite said hinged edge and cavity of said mold halves and radially slidable therein,
   means for pivoting said mold half about said hinge, and
   means for reciprocating said first and second inserts, whereby when at their innermost position said inserts and mold cavities form a continuous mold.
3. An apparatus for molding in accordance with claim 2 wherein said mold halves have a plurality of complementary abutting stops for holding said mold halves in spaced relationship.
4. An apparatus fold molding in accordance with claim 3 wherein said means for pivoting comprises:
   an actuator,
   an ear on the outer surface of said mold half, and
   means for coupling said actuator to said ear.
5. An apparatus for molding in accordance with claim 4 wherein said inserts have a longitudinal groove in each side thereof and a Teflon wiper mounted in said groove.
6. An apparatus for molding in accordance with claim 5 wherein said mold halves have a plurality of longitudinal bores adjacent said cavities for receipt of a heating means.
7. An apparatus for molding in accordance with claim 6 wherein said inserts have a base portion in abutting relationship to the outer edges of said mold halves for holding said mold halves in alignment.
8. An apparatus for molding comprising:
   a pair of mold halves having complementary cavities therein and complementary laterally extending portions from the top of said mold half to the upper edge of said cavities therein,
   a hinge pivotably connecting and holding in spaced aligned relationship the lower end of said mold halves,
   a contoured insert mounted in the spaced area between said mold halves and radially slidable therein,
   means for pivoting said mold half about said hinge, and means for reciprocating said insert, whereby when at its innermost position, said insert and mold cavities form a continuous mold.
9. An apparatus for molding in accordance with claim 8 wherein said means for pivoting comprises:
   an actuator,
   an ear on the outer surface of said mold half, and
   means for coupling said actuator to said ear.
10. An apparatus for molding in accordance with claim 9 wherein said insert has a longitudinal groove in each side thereof and a Teflon wiper mounted in said groove.
11. An apparatus for molding in accordance with claim 10 wherein said mold halves have a plurality of longitudinal bores adjacent said cavities for receipt of a heating means.
12. Apparatus in accordance with claim 11 wherein said insert has a base portion in abutting relationship to the outer edges of said mold halves for holding said mold halves in alignment.
13. An apparatus for molding comprising:
   a pair of mold halves having complementary cavities therein and a plurality of bores surrounding said cavities,
   a plurality of complementary stops spaced along one edge of said mold halves in abutting relationship for holding said mold halves in spaced relationship,
   a L shaped lug extending downwardly from said outer stops, said lugs having a coaxial bore therein,
   a hinge pin capable of insertion in the aligned bores of said lugs for providing a pivotable connection between said mold halves,
   means for pivoting said mold half about said hinge pin,
   an insert having a base portion, a body portion, and a contoured portion slidably mounted between the spaced mold halves with said base portion extending outwardly of said mold halves, said insert being capable of movements towards and away from said complementary cavities, and
   means for reciprocating said insert towards and away from said complementary cavities, whereby when at its innermost position said contoured portion aids in forming a continuous mold and said base portion abuts the outer edges of said mold halves to hold said mold halves in alignment.
14. An apparatus for molding comprising:
   a pair of mold halves having complementary cavities therein,
   a plurality of complementary abutting stops spaced along one edge of said mold halves for holding said mold halves in spaced relationship,
   a L shaped lug extending downwardly from said outer stops, said lugs having an aligned bore therein,
   a hinge pin capable of insertion in the bores of said lugs for providing a pivotable connection between said mold halves,
   means for pivoting said mold half about said hinge pin,
   an insert slidably mounted between the spaced mold halves and capable of movement towards and away from said complementary cavities, whereby said insert aids in forming a continuous mold, and
   means for reciprocating said insert towards and away from said complementary cavities.

References Cited
UNITED STATES PATENTS 2,513,052  6/1950  Roberts.
2,541,544  2/1951  Rahaim.

J. HOWARD FLINT, Jr., *Primary Examiner.*